(12) United States Patent
Billiet

(10) Patent No.: US 9,782,716 B2
(45) Date of Patent: Oct. 10, 2017

(54) METHOD AND APPARATUS FOR REMOVING WATER FROM COMPRESSED AIR

(71) Applicant: Nano-Porous Solutions Limited, Tyne and Wear (GB)

(72) Inventor: Colin Billiet, Tyne and Wear (GB)

(73) Assignee: NORGREN LIMITED (GB)

( * ) Notice: Subject to any disclaimer, the term of this patent is extended or adjusted under 35 U.S.C. 154(b) by 0 days.

(21) Appl. No.: 14/758,855

(22) PCT Filed: Dec. 23, 2013

(86) PCT No.: PCT/GB2013/053424
§ 371 (c)(1),
(2) Date: Jul. 1, 2015

(87) PCT Pub. No.: WO2014/106740
PCT Pub. Date: Jul. 10, 2014

(65) Prior Publication Data
US 2015/0336047 A1    Nov. 26, 2015

(30) Foreign Application Priority Data
Jan. 2, 2013   (GB) .................................. 1300025.2

(51) Int. Cl.
*B01D 53/04*   (2006.01)
*B01D 53/26*   (2006.01)
(Continued)

(52) U.S. Cl.
CPC ....... *B01D 53/0407* (2013.01); *B01D 53/047* (2013.01); *B01D 53/053* (2013.01);
(Continued)

(58) Field of Classification Search
CPC .. B01D 53/02; B01D 53/0407; B01D 53/047; B01D 53/053; B01D 53/261;
(Continued)

(56) References Cited

U.S. PATENT DOCUMENTS 4,680,938 A  *  7/1987  Caley ................... B01D 53/265
                                                    62/93
4,983,190 A  *  1/1991  Verrando ............... B01D 53/02
                                                    95/11
(Continued)

FOREIGN PATENT DOCUMENTS

EP         0745419        12/1996
EP         1155729        11/2001
(Continued)

OTHER PUBLICATIONS

Corresponding Search Report for GB1300025.5 dated Jul. 9, 2013.
(Continued)

*Primary Examiner* — Frank Lawrence
(74) *Attorney, Agent, or Firm* — The Belles Group, P.C.

(57) ABSTRACT

A method and apparatus for removing water from compressed air is disclosed. The method includes the steps of passing a stream of compressed air through a pressure swing adsorption (PSA) dryer. The dryer includes at least one vessel containing a desiccant material bound into pieces, for example tubes, using a polymer binder. The PSA dryer also has a control system for controlling the flow of the compressed air and switching between drying and purging modes. In particular the vessel and desiccant material contained therein are sized to produce a dew point suppression of less than 50° C.

5 Claims, 7 Drawing Sheets

(51) Int. Cl.
B01D 53/047 (2006.01)
B01D 53/053 (2006.01)
B01J 20/18 (2006.01)
B01J 20/26 (2006.01)
B01J 20/28 (2006.01)
B01J 20/30 (2006.01)
B01J 20/34 (2006.01)
B01D 53/02 (2006.01)
B01D 53/28 (2006.01)

(52) U.S. Cl.
CPC .......... B01D 53/261 (2013.01); B01J 20/18 (2013.01); B01J 20/262 (2013.01); B01J 20/2803 (2013.01); B01J 20/3007 (2013.01); B01J 20/3491 (2013.01); B01D 53/02 (2013.01); B01D 53/28 (2013.01); B01D 2253/108 (2013.01); B01D 2253/202 (2013.01); B01D 2253/34 (2013.01); B01D 2257/80 (2013.01); B01D 2259/401 (2013.01); B01D 2259/40003 (2013.01); B01D 2259/40009 (2013.01); B01D 2259/40052 (2013.01); B01D 2259/40081 (2013.01); B01D 2259/4525 (2013.01); B01D 2259/4533 (2013.01); B01D 2259/4566 (2013.01); B01J 2220/56 (2013.01)

(58) Field of Classification Search
CPC .............. B01D 53/28; B01D 2253/108; B01D 2253/202; B01D 2253/34; B01D 2257/80; B01D 2259/40003; B01D 2259/40009; B01D 2259/40052; B01D 2259/40081; B01D 2259/401; B01D 2259/4525; B01D 2259/4533; B01D 2259/4566; B01J 20/18; B01J 20/262; B01J 20/2803; B01J 20/3007; B01J 20/3491; B01J 2220/56
USPC ............ 96/121; 95/117, 96; 34/472, 473, 80
See application file for complete search history.

(56) References Cited

U.S. PATENT DOCUMENTS

| 5,669,962 | A | 9/1997 | Dunne | |
| 6,585,810 | B1* | 7/2003 | Gaita | B01D 53/02 96/121 |
| 2005/0235615 | A1 | 10/2005 | Nyman et al. | |
| 2007/0169627 | A1* | 7/2007 | Fornof | B01D 53/0415 96/108 |
| 2011/0011803 | A1* | 1/2011 | Koros | B01D 53/02 210/670 |
| 2014/0174295 | A1* | 6/2014 | Tai | B01D 53/0407 96/111 |

FOREIGN PATENT DOCUMENTS

| EP | 2914365 | 9/2015 |
| WO | 2005089237 | 9/2005 |

OTHER PUBLICATIONS

Corresponding International Search Report for PCT/GB2013/053424 dated Sep. 7, 2014.
Corresponding Examination Report from the European Patent Office dated Jan. 27, 2017.

* cited by examiner

METHOD AND APPARATUS FOR REMOVING WATER FROM COMPRESSED AIR

CROSS-REFERENCE TO RELATED PATENT APPLICATIONS

The present application is a U.S. national stage application under 35 U.S.C. §371 of PCT Application No. PCT/GB2013/053424, filed Dec. 23, 2013, which in turn claims priority to U.K. Application No. 1300025.2, filed Jan. 2, 2013, the entireties of which are incorporated herein by reference.

The present invention relates to a method and apparatus for removing water from compressed air and relates particularly, but not exclusively, to a compressed air drying system for use on a railway vehicle. It also relates to a compressed air drying system for use on small and medium-sized oil free compressors that are used to charge a storage tank.

Compressed air is widely used throughout industry as a safe and reliable source of energy. However, the quality of the compressed air delivered by the compressor is unsuitable for use without treatment to improve its purity. Compressed air contains contaminants such as water, oil and particulate which must be removed before use. Treating compressed air has generally involved filtering it, to remove oil/water aerosols and dirt, and drying it to remove water vapour.

An example of a dryer that is commonly used is a refrigeration dryer. This type of dryer produces dry air for general use and they are cheap and easy to use. When subjected to an overload, by excessive air flow or high temperatures, their performance is affected but recovers when normal duty is resumed. The principle of operation is to cool the air with a refrigerant gas to inlet air heat exchanger causing water vapour to condense into water droplets which are removed by mechanic means (typically a centrifugal separator) before the air is re-heated by means of an inlet air to outlet air heat exchanger. The dryness of the air is limited to above the freezing point of water since ice would form at lower temperatures causing the dryer to cease operation.

ISO 8573.1 is used to rate the quality of compressed air and the humidity quality classes which are achievable using refrigerated dryers are: Class 6 with a Pressure Dew Point (PDP) of +10° C.; Class 5 with a PDP of +7 C.°; and Class 4 with a PDP of +3° C. Test conditions for compressed air dryers are shown in ISO 7813. The inlet temperature is specified as +35° C.

General factory air is the main application for refrigeration dryers where the ambient air temperature in the factors remains above the PDP delivered by the dryer. About 9 out of 10 of all factory dryers are of this type as they provide adequate drying for most uses and use little energy.

Another example of a type of dryer is the membrane dryer which uses fine semipermeable fibres to separate off the water from the remainder of the air. High pressure air is passed through a bundle of such fibres and the fast gases, such as water vapour, permeate through the semi-porous structure.

Membrane fibres are very fine and pressure loss through the fibres is significant making the energy input significant. Such dryers are generally used for small flows since they are energy intensive but they provide a dew point suppression (DPS) which is useful since many applications do not require very dry air, they simply need air that will not produce condensation in the event of a small temperature drop. DPS means that the outlet purity of the compressed air varies according to the inlet air flow rate, pressure and temperature. Like the refrigerated dryers performance will within limits recover from a degree of over loading.

Because the fibres are fine they can also be delicate and when subjected to chemical contamination, pressure fluctuations and shock and vibration they are known to break and the air escapes to atmosphere resulting in a loss of compressed air. However, membrane dryers are simple to use, are low maintenance and relatively inexpensive to buy.

A further type of dryer is the desiccant dryer which uses a regenerable desiccant to remove water from the air. This type of dryer is used when high purity compressed air is required for critical applications. The design of such products is quite simple and investment cost quite low but they require high energy for regeneration of the desiccant. As such there use is limited to such applications which justify the high energy requirement. These applications call for the compressed air dew point to be lower than outside ambient temperatures or where cooling may occur when the application may cause cooling which would result in condensate forming (instrumentation, air bearings). Desiccant dryers are also referred to as pressure swing adsorption (PSA) dryers.

ISO 8573.1 humidity quality classes which are achievable using desiccant dryers are: Class 3 with a Pressure Dew Point of −20° C.; Class 2 with a PDP of −40 C.°; and Class 1 with a PDP of −70° C.

Twin columns (or beds) of desiccant materials are employed to deliver a continuous stream of dry compressed air, with one column working on-line (drying) whist the other is off-line (regenerating). Operating pressures are limited to 4 bar and above since below 4 bar there is not enough energy available to carry out regeneration of the off-line adsorption bed. Typically operation is at 7-10 bar (100-145 psig). Compressed air is fed to the first on-line column where water vapour is removed by the granular desiccant adsorption bed which is very efficient in adsorbing water vapour. As drying takes place an adsorption isotherm progresses through the adsorption bed. Care must be taken to limit the loading of water on the bed since this will result in the outlet air dew point deteriorating and not only failing to maintain the outlet air purity required but also render this air progressively less able to effect regeneration.

When the on-line adsorption bed is loaded with moisture (typically after 2-5 minutes) inlet air is switched to the second column. The used first column is then rapidly depressurised to release some of the adsorbed water vapour and then an amount of the dry outlet air from the now on-line adsorption column is passed through a control valve or fixed orifice where as it is de-pressurised it increases in volume. As it sweeps through the used adsorption bed it strips away water vapour from the desiccant making it ready for re-use. This purge air, as it is known, must be very dry otherwise complete regeneration would not take place. This means the outlet purity must be maintained or inadequate regeneration would take place and on subsequent cycles the mass transfer zone would advance through the adsorption bed permanently damaging the adsorption material which would eventually require replacement. It is worth noting that typically the purge air used is 20-25% of the total volume of dry air produced therefore meaning that such dryers require significant energy input to function. However, where a very low dew point is required this investment is worthwhile and the low dew points of ISO8573.1 classes 1 to 3 are only achieved using desiccant dryer.

A variation on this type of dryer is the heat-regenerative desiccant air dryers or pressure and temperature swing adsorption (PTSA) dryers. PTSA adsorption dryers work in a similar way to PSA dryers but as the name suggests they use addition heat for regeneration which means the adsorption beds are increased in size to provide enough time for heating and cooling. The on-line bed therefore can be loaded to a higher level since the addition of heat facilitates regeneration from a more highly loaded bed. Such products are expensive and more complex and as such are few in numbers compared to PSA dryers.

A variation on the PTSA dryer is disclosed in our previous application published as WO2009/053760. In this example, the desiccant is formed into tubes each of which is provided with an outer layer that acts as a heater when connected to an electrical supply. This allows very even heating of the desiccant material throughout each column significantly speeding up the heating and cooling process, thereby speeding up the purge time and significantly reducing the amount of purge air required.

From the above it can be seen that if it is the case that where drying is required to ISO8573.1 classes 1 to 3, a desiccant dryer is required. If drying is required to classes 4 to 6 or if dew point suppression is required, other drying techniques such as refrigeration and membrane drying are used.

Where the supply of compressed air is used on a small scale and on a more intermittent basis it is a common arrangement to have a small compressor charge a tank, which is capable of withstanding high internal pressures, with compressed air. As the air is needed it is drawn from the tank and the compressor only switches on again when the pressure in the tank drops below a predetermined level. Small compressors and tanks of this type of commonly used to power small tools, for example, to power the tools used by a dentist.

As with other applications the compressed air produced by such systems requires drying before it enters the storage tank and because the compressor is not constantly working it is possible to use a PSA dryer with a single column. Air from the compressor passes through the column and charges the storage tank. Once sufficient pressure is built up in the storage tank the compressor switches off and a small volume of the compressed air in the tank is used to purge the water from the desiccant in the column in the manner described above. Once the purge is complete the compressor dryer column can remain unused until the pressure in the tank decreases below the predetermined level triggering a signal for the compressor to become active again.

Small compressed air supply systems, of the type described above, have the disadvantage that dryers require servicing more often than the compressors. In some circumstances this results in the dryer not being properly serviced and they can on occasion stop working correctly thereby allowing moist air to pass through the dryer, into the tank and beyond potentially causing damage to downstream equipment. Furthermore, PSA columns of this type require a filter located between the compressor and the dryer inlet to ensure that contaminants such as oil, particulates and excess water in droplet form do not enter the dryer column. This problem can be partially addressed by using an oil free compressor. However, such compressors still produce compressed air containing water droplets which can significantly damage the desiccant material, from which the desiccant cannot recover, and in turn resulting in reduced drying performance. It is also the case that desiccant beads produce dust, particularly when damaged by excess water, which can damage downstream apparatus. Furthermore drying systems utilising beads should only be operated in a vertical orientation to ensure that the bed of beads does not settle forming a bypass for the stream of compressed air to follow without properly passing through the desiccant.

Preferred embodiments of the present invention seek to overcome the above described disadvantages of the prior art.

According to an aspect of the present invention, there is provided a method of removing water from compressed air comprising, passing a stream of compressed air through a pressure swing adsorption dryer, the dryer including:—
- at least one vessel containing at least one desiccant material formed into desiccant members using a polymer binder; and
- at least one control system for controlling the flow of said compressed air and switching the flow of said compressed air between a drying mode and a purging mode, wherein said vessel and said desiccant material contained therein are sized to produce a dew point suppression of less than 50° C.

By providing a pressure swing adsorption dryer with a polymer bound desiccant and sizing the amount of desiccant material used to produce a dew point suppression of less than 50° C. provides the following advantages. This method allows a desiccant dryer to be used in circumstances where a specific and relatively small decrease in dew point is required, which has not been possible with desiccant beads of the prior art. For example, some medical devices require a supply of air with a dew point of 10° C. lower than the ambient air. In the past this was only achievable using a refrigeration dryer or a membrane dryer. A refrigeration dryer has the disadvantage that it is a large piece of apparatus even where only a small dew point suppression is required. Furthermore, this method allows a desiccant dryer to produce compressed air with a moisture content complying with classes 2 to 6 of ISO 8573.1. In the present invention, this is possible because the use of the polymer bound desiccant allows complete purging and regeneration of the desiccant bed using air with a higher moisture content than is possible with traditional desiccant materials such as molecular sieve and zeolite desiccants bound with a clay binder such as bentonite or desiccants such as silica gel. The kinetics of these desiccant materials are much slower than those of the polymer bound desiccant. As a result, the dry purge air that is fed back into the desiccant bed during the purge cycle does not need to be as dry as was the case with the desiccants of the prior art.

Furthermore, where the present invention is used in, for example, railway vehicles, there are significant advantages over similar systems of the prior art. For example, where traditional desiccant dryers have been used it is necessary to ensure that the output air from the drying column is very dry in order for it to operate effectively in purging the column that is not in use. As a result, such desiccant dryers are required to be very large and take up a significant amount of the limited space on such a vehicle. Furthermore, a dryer containing beads should preferably be oriented so that the direction of flow of air is upwards through the bed of desiccant beads. However, this orientation is inconvenient on a railway vehicle and it is preferred that the drying columns are laid horizontally. However, this orientation risks the settling of the desiccant beads within the vessel and providing a bypass along the upper edge of the vessel which results in very little contact between the air and the desiccant beads and therefore inefficient or very limited drying taking place. It is also the case that in the prior art the movement of the vehicle causes agitation of the beads resulting in the formation of a fine dust of desiccant and/or binder. This must be filtered before the air can be allowed to pass to downstream apparatus as it may cause damage. The polymer binder used in the present invention substantially eliminates the production of dust and thereby increasing the useful working life of the desiccant material which in turn reduces the need for regular servicing.

It is also the case that the removal of a bentonite clay binder means that in the event that the desiccant is exposed to bulk water or where the desiccant is exposed to too much moisture in the air (for example due to an overload of airflow beyond the normal limits) the desiccant can recover its water absorbing properties once input levels return to normal. This is not the case with a bentonite clay bound desiccant or where activated alumina is used as the desiccant, both of which become damaged by excess water. These problems of dust in traditional desiccant bead dryers are exacerbated by the crush strength of adsorbent beads being reduced significantly once subjected to exposure to water in the form of droplets or liquid. This weakness makes the beads even more vulnerable to breakdown whilst in use. In rail applications servicing of desiccant cartridges typically takes place every 6 months whereas the adsorbent tube technology of the present invention is expected to last up to 10 years. It should also be noted that membranes suffer short life with a typical 2 years life expectancy. This is in part due to their vulnerability to chemical contamination which weakens and damages the delicate membranes and due to the stop/start nature of their duty which may reduce their life to as little as 6 months.

It can therefore be seen that the present invention allows the use of a desiccant dryer, with advantages including size and ease of operation, under circumstances where desiccant dryers have never previously been used.

In a preferred embodiment, the vessel receives compressed air with a dew point of up to 50° C.

In another preferred embodiment, the desiccant material produce compressed air with dew points of greater than −10° C.

In a further preferred embodiment, the desiccant members comprise a plurality of tubes extending along said vessel.

By using a plurality of tubes extending along the vessel, the advantage is provided that the flow of air through the desiccant material is precisely controlled to consistently provide the output required. Furthermore, the use of tubes allows a horizontal orientation of the vessel without risk of the desiccant settling and providing a bypass route at the top of the vessel.

In a preferred embodiment, the dryer is not provided with means for heating the desiccant material during the purging mode.

Removing any heating apparatus from the vessel significantly simplifies the apparatus.

According to another aspect of the present invention, there is provided an apparatus for removing water from compressed air comprising, a pressure swing adsorption dryer for passing a stream of compressed air therethrough, the dryer including:— at least one vessel containing at least one desiccant material formed into desiccant members using a polymer binder; and at least one control system for controlling the flow of said compressed air and switching the flow of said compressed air between a drying mode and a purging mode, wherein said vessel and said desiccant material contained therein are sized to produce a dew point suppression of less than 50° C.

In a preferred embodiment, the desiccant members comprise a plurality of tubes extending along said vessel.

In a further preferred embodiment, the vessel is not provided with means for heating the desiccant material during the purging mode.

According to an aspect of the present invention there is provided an apparatus for removing water from compressed air and for location between a compressor and a compressed air storage tank, the apparatus comprising:— at least one vessel defining a volume and containing at least one desiccant material formed into desiccant members using a polymer binder;

at least one inlet for allowing a stream of compressed air to enter said vessel, said inlet having an inlet valve for controlling the flow of air through said inlet;

at least one first outlet for allowing said stream of compressed air to exit said vessel after passing at least partially through said volume, said first outlet having a first outlet valve for controlling the flow of air through said first outlet; and at least one second outlet, located adjacent said inlet, for allowing the exhaust of purging gases passing back through said vessel from the storage tank, said second outlet having a second outlet valve for controlling the flow of air through said second outlet, wherein said second outlet valve comprises a solenoid valve adapted to open in response to the compressor turning off and close after a predetermined period of time.

By using a solenoid valve with a predetermined open period and desiccant members formed using a polymer binder, the advantage is provided that a low cost and low maintenance dryer can be used to dry air from a compressor before it enters a storage tank. In particular, where an oil free compressor is used there is no need for filters to remove oil. If some excess droplet water comes into contact with the desiccant members the polymer binder ensures that the desiccant members are not damaged by the liquid water and can soon recover their drying capabilities. As a result, the dryer column can have a life expectancy, without the need for service, which exceeds that of the compressor. This therefore removes the need to service any part of the compressor since using the dryer element of the present invention makes the dryer as reliable as the compressor. Furthermore, the use of a timer allows the degree of the dew point suppression provided by the apparatus to be set by the timer.

The desiccant members may comprise a plurality of tubes extending along said vessel.

In a preferred embodiment of the second outlet valve opens in response to a signal from a pressure switch on the compressor.

Utilising the signal from the pressure switch on the compressor to control the solenoid valve significantly simplifies the circuitry needed to operate the dryer. The solenoid valve opens in response to the compressor going off-line and closes after the predetermined period having provided sufficient dew point suppression for the conditions the compressor is operating in and for the requirements of the downstream system using the compressed air.

In another preferred embodiment the second outlet valve is provided with a variable timer controlling the period of time the valve remains open.

By using a variable timer for controlling the period of time that the valve remains open the advantage is provided that the dew point suppression achieved by the dryer can be varied by simply varying the time that the purge outlet valve remains open.

According to another aspect of the present invention there is provided an apparatus for removing water from compressed air and for location between a compressor and a compressed air storage tank, the apparatus comprising:—
at least one vessel defining a volume and containing at least one desiccant material formed into desiccant members using a polymer binder;
at least one inlet for allowing a stream of compressed air to enter said vessel, said inlet having an inlet valve for controlling the flow of air through said inlet;
at least one first outlet for allowing said stream of compressed air to exit said vessel after passing at least partially through said volume, said first outlet having a first outlet valve for controlling the flow of air through said first outlet; and
at least one second outlet, located adjacent said inlet, for allowing the exhaust of purging gases passing back through said vessel from the storage tank, said second outlet having a second outlet valve for controlling the flow of air through said second outlet, wherein said second outlet valve is provided with a variable timer controlling the period of time the valve remains open thereby allowing variable dew point suppression to be achieved.

By using a variable timer on the exhaust and desiccant material formed into desiccant members using a polymer binder, the advantage is provided that the dew point suppression achieved by the dryer can be varied by simply altering the time that the exhaust valve remains open. Desiccants of the prior art that do not utilise a polymer binder vary the dew point by varying the volume of desiccant used. Such desiccants must be completely dried by the purge cycle since excess moisture eventually damages the desiccant members. Even though the process used in the present invention can result in some of the desiccant never being completely purged, the use of a polymer binder means that the desiccant members are not damaged by continual engagement with water.

The desiccant members may comprise a plurality of tubes extending along said vessel.

In a preferred embodiment the second outlet valve opens in response to a signal from a pressure switch on the compressor.

In another preferred embodiment the second outlet valve comprises a solenoid valve adapted to open in response to the compressor turning off and close after a predetermined period of time.

Preferred embodiments of the present invention will now be described by way of example only, and not in any limitative sense, with reference to the accompanying drawings in which:—

Figure 1:
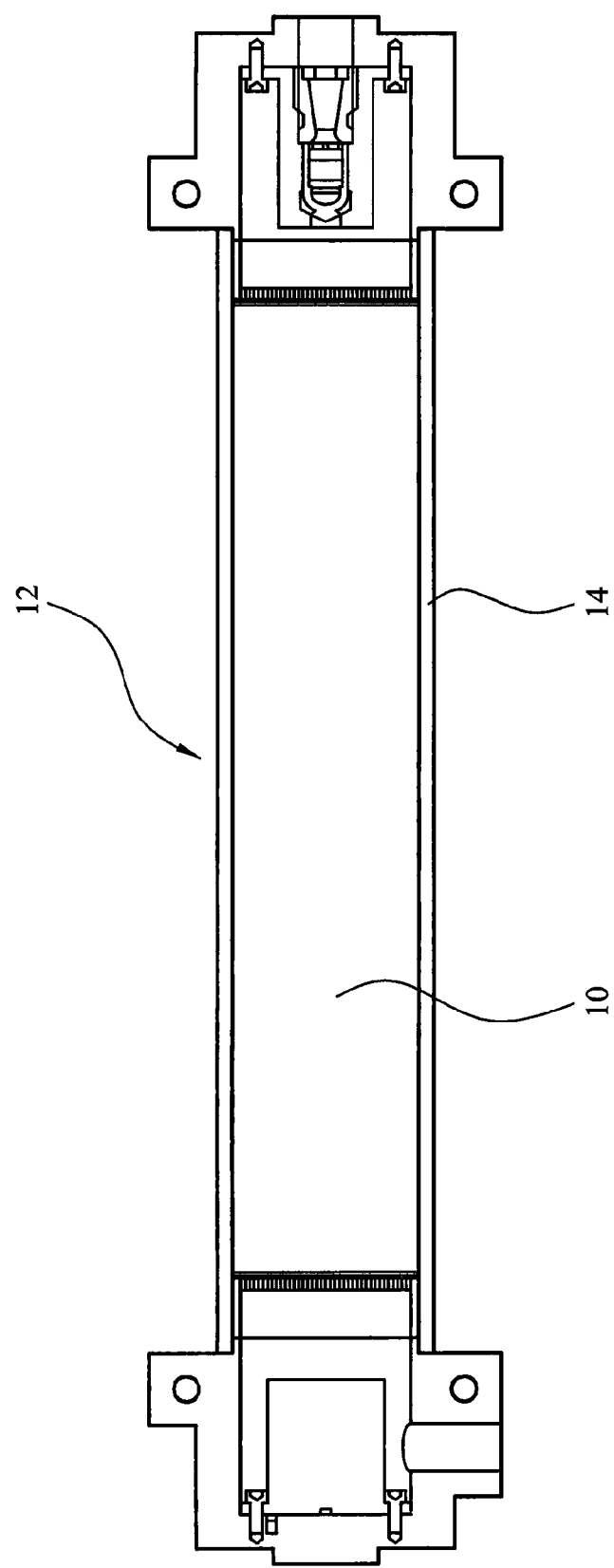
FIG. 1 is a sectional view of a drying device used in an embodiment of the present invention.
Figure 2:
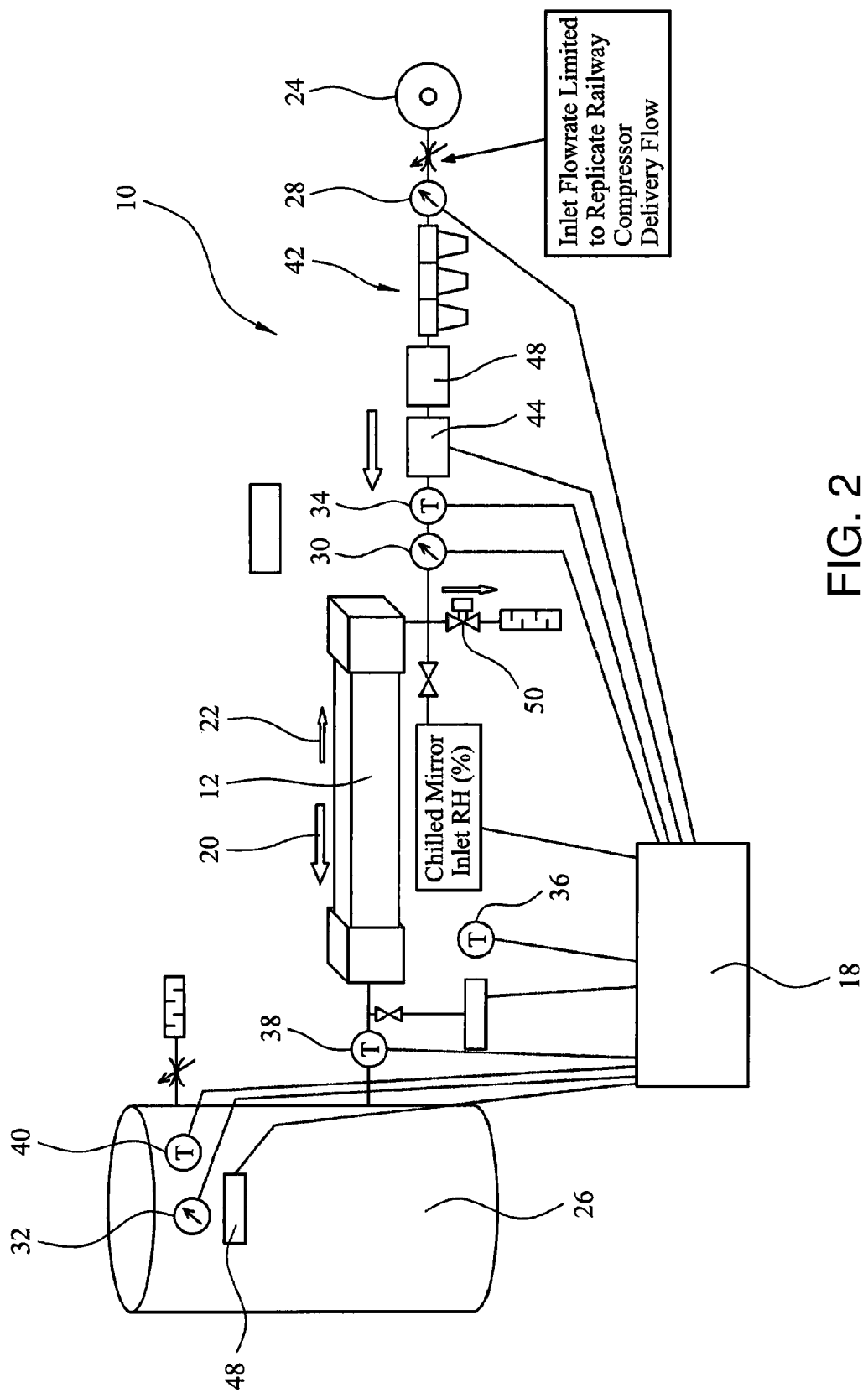
FIG. 2 is a schematic representation of a compressed air system incorporating the device of FIG. 1.
Figure 3:
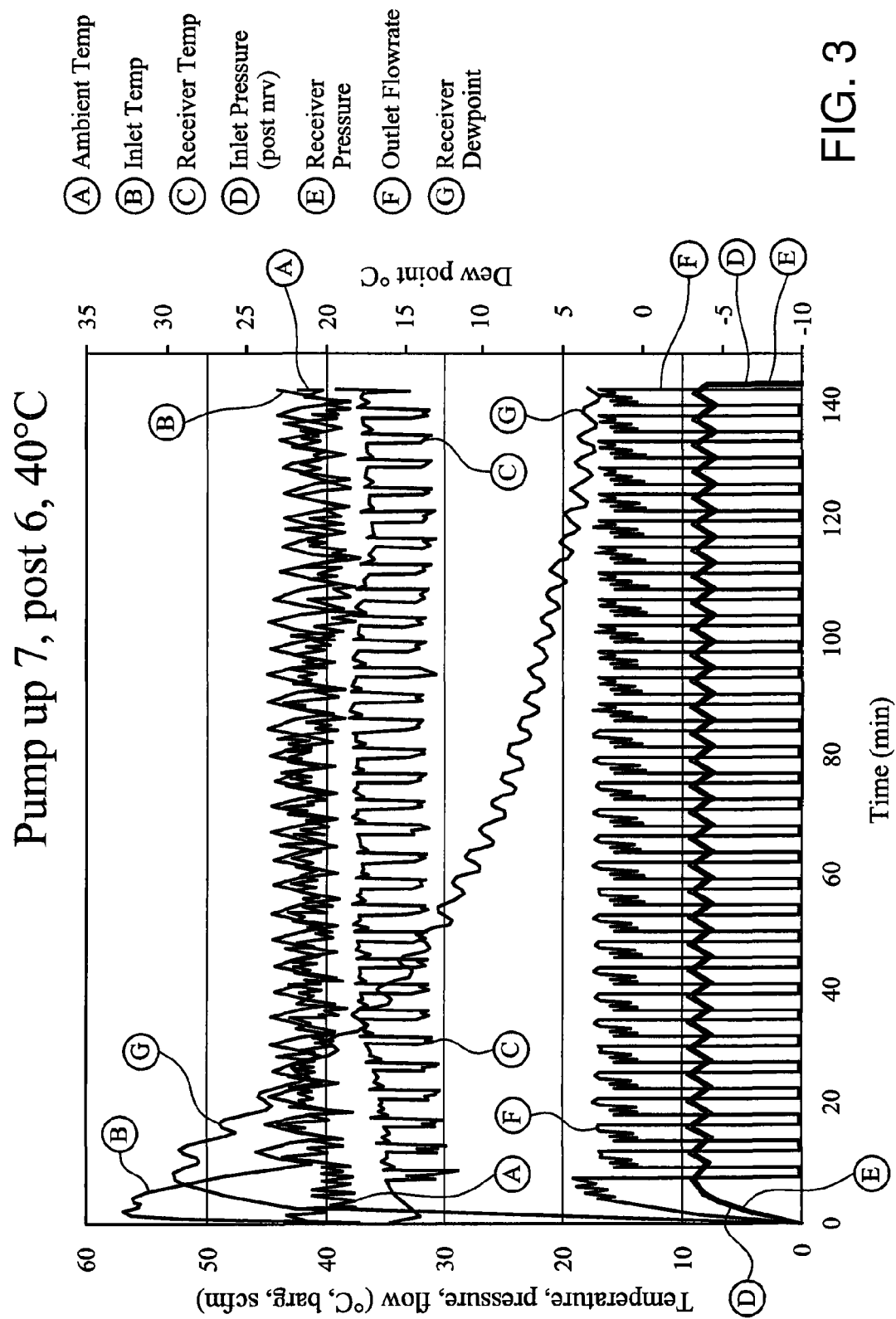
FIG. 3 is a graph showing the dew point recovery of an embodiment of the present invention.

Referring to FIGS. 1 to 3, a compressed air delivery system 10 includes a pressure swing adsorption (PSA) dryer 12. In the example shown the PSA dryer 12 is a single column dryer although it should be noted that the present invention is equally applicable to a two column dryer. The PSA dryer 12 includes a vessel 14 that contains a desiccant material that is formed into desiccant members using a polymer binder. In the embodiment presently described, the desiccant members are formed into tubes 16 that are arranged in a bundle that extend along the length of vessel 14. The tubes 16 are formed by combining a polymer with a desiccant material and extruding in the form of a tube. An example of the polymer is polyethersulphone (PES) although other durable polymer binders may also be used and most preferably binders that do not absorb any water. The desiccant material used is most preferably zeolite molecular sieve although other desiccant materials with fast kinetics are also acceptable. The tubes are typically formed with a 2 mm diameter and a 0.9 mm bore extending therethrough.

The compressed air system device also includes a control device 18 for controlling the flow of compressed air through the PSA dryer 12. In particular, the control device 18 switches the flow of compressed air between a drying mode indicated at 20 by the directional arrow and a purge mode indicated by arrow 22. The flow of compressed air is controlled by a series of valves contained within the PSA dryer and operate in a manner familiar to those skilled in the art.

The compressed air system shown in FIG. 2 includes a compressed air source 24 and a compressed air reservoir 26. Measurements of temperature and pressure are taken throughout the system using pressure measuring devices 28, 30 and 32 and temperature measuring devices 34, 36, 38 and 40. After the compressed air source and pressure measuring device, a series of filters indicated at 42 remove oil, particulate matter and water droplets, reducing contamination of the PSA dryer. A mass flow meter 44 and pressure regulator 46 control the flow of compressed air through to a further pair of pressure and temperature sensors 30 and 34.

The compressed air then enters the PSA dryer 12 and passes along desiccant tubes 16. The water contained in the air is quickly absorbed into the zeolite sieve that, in combination with the polymer, forms the desiccant tubes. The dry compressed air then passes through outlet valves and via temperature sensor 38 to the compressed air reservoir 26. Within the reservoir the pressure and temperature are measured by sensors 32 and 40 and the dew point is also measured by dew point measuring device 48. Once a required pressure has been reached, the flow of compressed air to the PSA dryer is cut off and purged air is returned from the reservoir 26 and passes back through the PSA dryer 12 in direction 22 at a significantly reduced pressure then passes through outlet valve 50. This quickly regenerates the desiccant to its dehydrated state. Because of the fast kinetics of the combination of desiccant with non-water absorbing polymer binder, the air returning from reservoir 26 does not need to have a dew point as low as it would if a standard bead desiccant of the prior art were being used. In the prior art, the difference between the dew point of the air entering the PSA dryer and exiting the PSA dryer needed to be more than 50° C. in order that the purging air would be able to sufficiently dry the desiccant beads before drying was recommended.

It is therefore possible for the apparatus to operate with a dew point suppression, that is the difference between the dew point of the air entering the PSA dryer and the air exiting the PSA dryer (of as little as 5° C.). It should be noted that any dew point suppression below this would be of very limited value since the change in dew point is so small as to be of little use. A dew point suppression of 10° C. may be of use in a medical situation where the air supplied to a device or patient needs to be slightly less than the ambient air. A dew point suppression of 20-30° C. may be of use on a small air compressor that operates in reasonably controlled environments. For example, such compressors are used to operate dentist's tools and only a small dew point suppression is required in order to ensure that no condensation forms in a device when there is a change in temperature in the room in which the device is located (for example when it cools overnight).

A dew point suppression of 30-40° C. is appropriate for use in the rail industry where it is important to ensure that when a railway vehicle stops being used and is stored overnight, any drop in temperature is not sufficient to cause condensation of water within air lines. As a result, a dew point suppression of 30-40° C. is sufficient.

FIG. 3 demonstrates dew point recovery from excessive duty where the inlet temperature increased to +57° C. The PDP was allowed to degrade to +30° C., full recovery to <+5° C. was achieved after a number of cycles following normal duty being resumed. For the 40° C. inlet temperature a DPS of 30-40° C. was achieved.

There are many other uses to which the device of the present application may be put and these are not limited to those set out above. The present invention is applicable to any situation where a small dew point suppression (up to 50° C.) is required and is also applicable to situations where air is required to be supplied with a moisture content meeting the standards set out in ISO 8573.1 levels 2 to 6.

Figure 4:
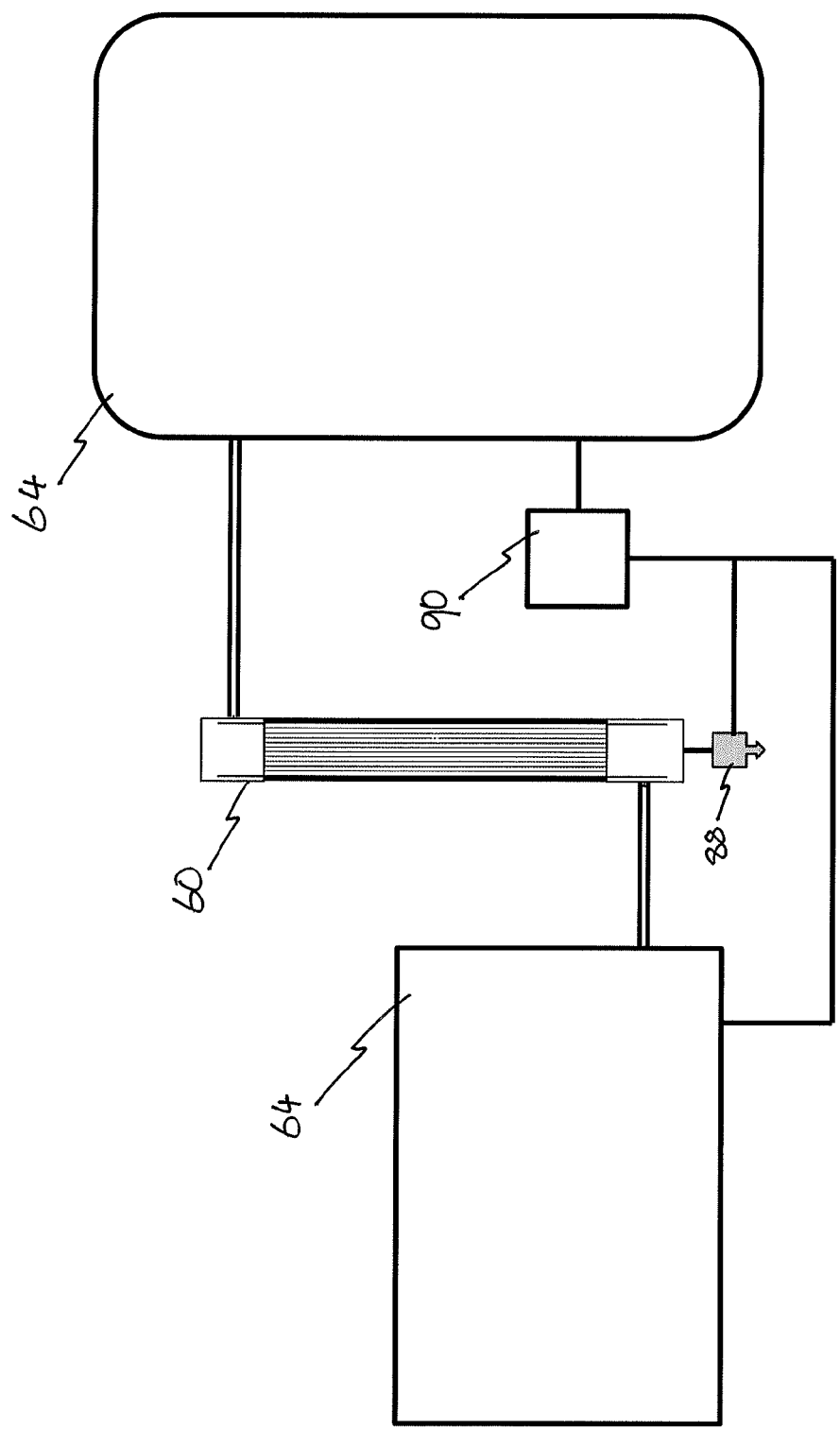
FIG. 4 is a schematic representation of a compressed air system including a drying apparatus used in another embodiment of the present invention.
Figure 5:
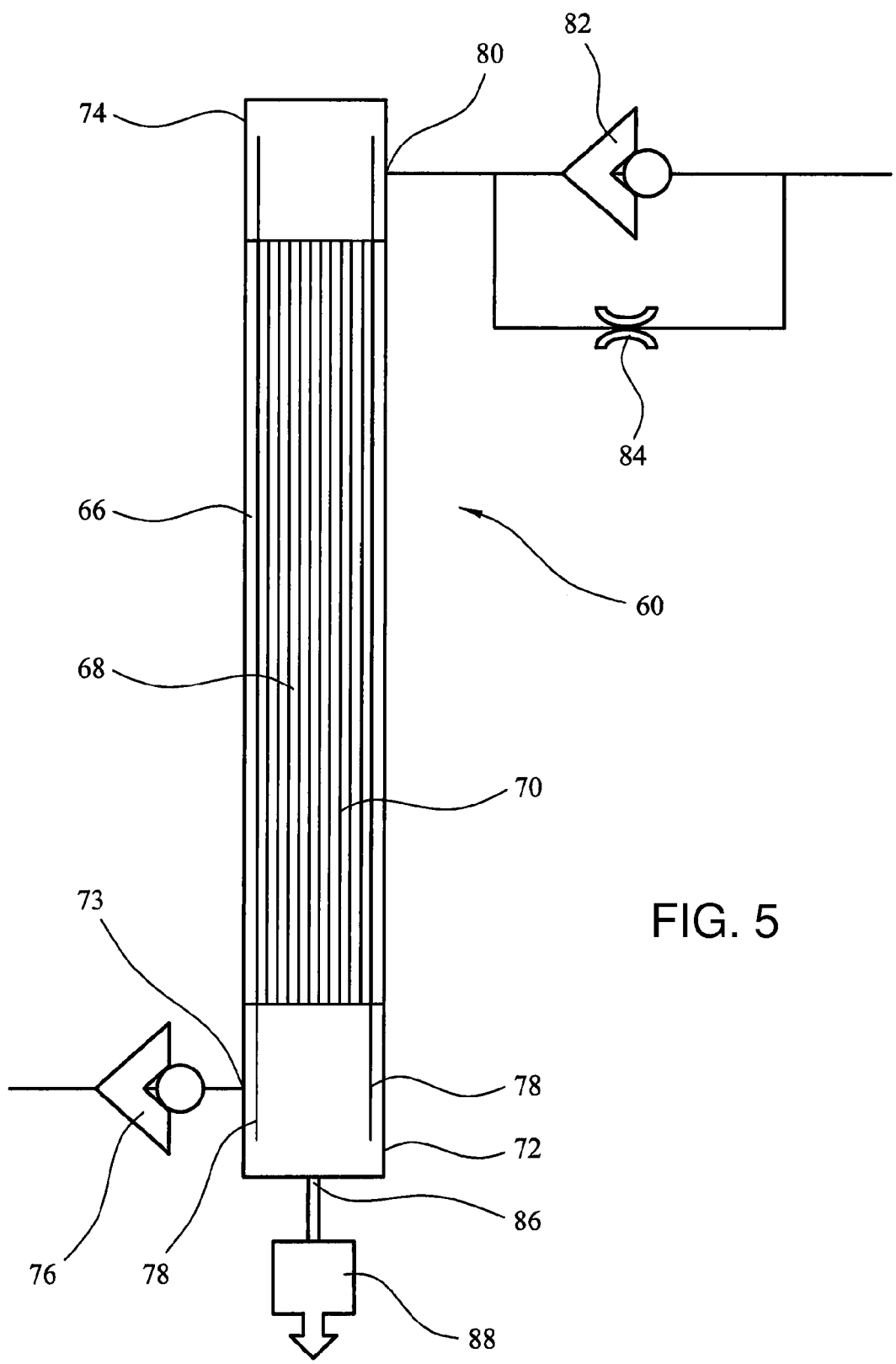
FIG. 5 is a schematic representation of the drying apparatus included in FIG. 4.
Figure 6:
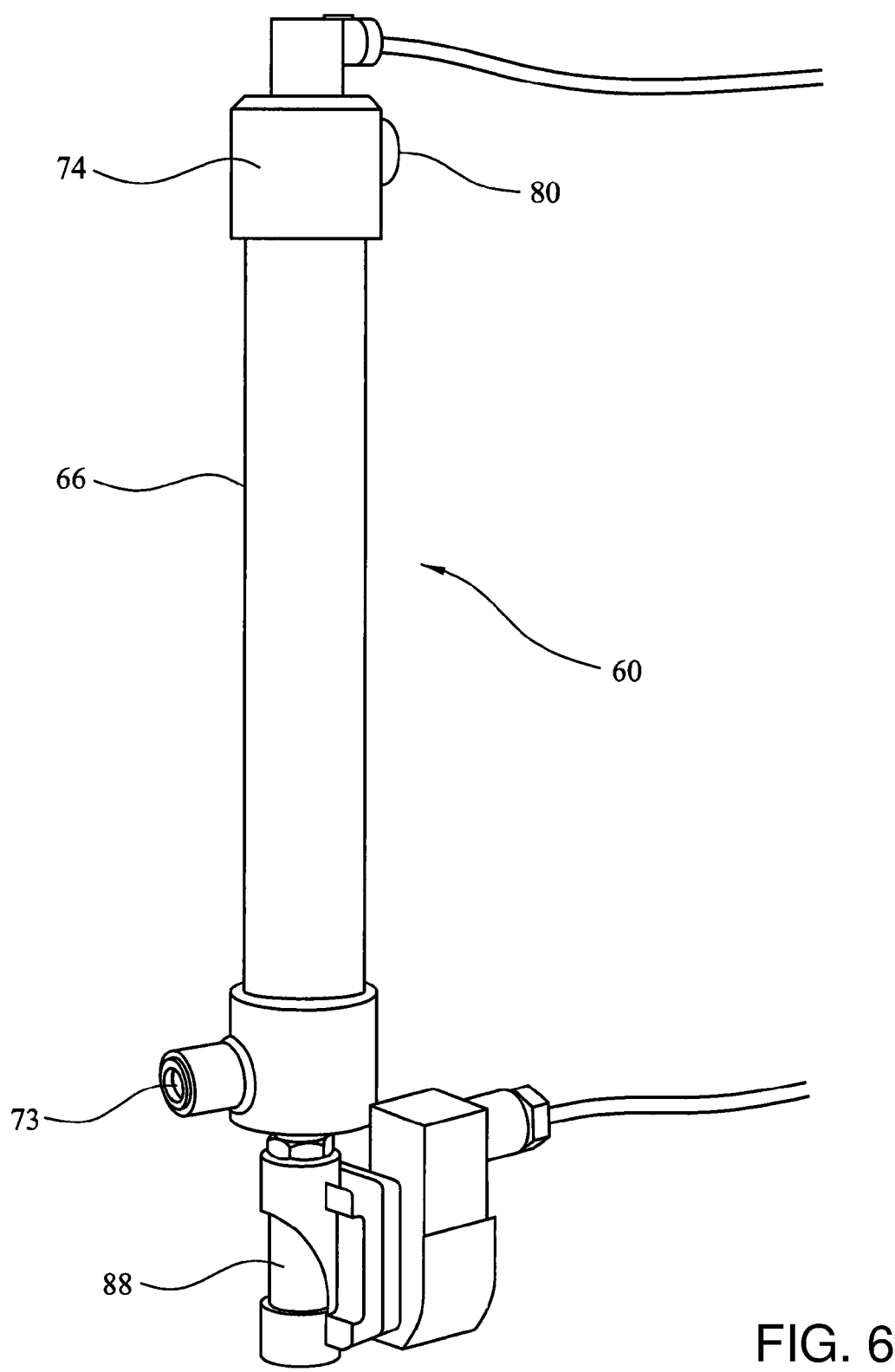
FIG. 6 is a perspective view of a apparatus embodying the invention shown schematically in FIG. 5.

Referring to FIGS. 4 to 6, an apparatus 60 for removing water from compressed air is designed to be located between a compressor device, which is preferably an oil free compressor 62 and a compressed air storage tank 64. The apparatus 60 includes a vessel 66 that defines a volume and contains a desiccant material 68. The desiccant material is bound together using a polymer binder and formed into desiccant members 70. These desiccant members are preferably in the form of tubes that extend along the length of vessel 66 and are typically formed with a 2 mm external diameter and a 0.9 mm bore extending therethrough. Although the above described tubes are preferable any suitable shape of desiccant member may be used including short lengths of the above described tubes randomly packed into the vessel 66 or desiccant members formed into beads. The desiccant can be any suitable desiccant but is preferably a zeolite molecular sieve, although other desiccant materials with fast kinetics may be used. The polymer can be any suitable durable polymer binder for example polyethersulphone (PES).

The vessel is formed with a pair of end caps 72 and 74. The first end cap 72, located at the bottom of the vessel 66, has an inlet 74 to allow a stream of compressed air to enter the vessel. The inlet 73 has an inlet valve 76 that controls the flow of air through the inlet 73. The inlet valve 76 can be a simple open and shut valve and does not need to be a variable flow control valve to control the rate of flow of the compressed air into the vessel. The inlet valve 76 is preferably a non-return valve. End cap 72 is provided with a baffle 78 that directs the stream of compressed air down into the end cap before it changes direction to pass up through the desiccant members 70. This assists to ensure an even flow of compressed air entering the portion of the vessel 66 that contains the desiccant members 70. The baffle 78 also acts to capture droplets of water and direct them to the bottom of end caps 72.

The second end cap 74, located at the top of vessel 66, has a first outlet 80 that is connected to tank 64. The first outlet 80 has a valve 82, preferably a non-return valve, and a purge orifice 84, which can be either fixed or variable, connected in parallel with the valve 82.

A second outlet 86 is provided in the first end cap 72 and is located at the bottom of the end cap. The second outlet 86 has a second outlet valve 88. This second outlet valve controls the flow of purging gases that passed back through the vessel from the storage tank. The second outlet valve has a timer function which controls the period of time that the valve remains open and this is preferably a variable timer that can be changed by simple operation of a switch or dial for example. Second outlet valve 88 is also preferably a solenoid valve and further preferably opens in response to a signal from a pressure switch 90 on the storage tank 64 which also controls the operation of the compressor 62.

Operation of the apparatus 60 will now be described. A stream of compressed air from compressor 62 passes through inlet valve 78 and into the inlet 73. The baffle 78 in end cap 72 forces the flow of compressed air down and any droplets of water in the compressed air hit the baffle 78 and run down towards the bottom of the end cap 72 from where they will be exhausted with any purge air through second outlet 86. The stream of compressed air passes up along the desiccant members 70 and water from the compressed air is adsorbed into the desiccant material resulting in a dryer air passing into end cap 74 and out of the first outlet 80. The dryer compressed air passes through valve 82, with a small volume passing through the purge orifice 84, before entering storage tank 64.

When sufficient air to fill tank 64 to a predetermined required pressure has passed through the apparatus 60 the pressure switch 90, associated with the tank 64, causes compressor 62 to switch off. This same signal causes solenoid valve 88 to open. This opening of valve 88 allows some of the compressed air from tank 64 to flow back through purge orifice 84 back into end cap 74 and down through the desiccant members 70. Because the first outlet valve 82 is a non-return valve, the air from tank 64 must passed through the orifice 84 which limits the flow of air ensuring that this flow of purge air is at reduced and near atmospheric pressure thereby allowing the purge of the moisture trapped in the desiccant material 68 from the desiccant members 70.

Solenoid valve 88 remains open for a predetermined period of time during which this purge takes place. When the predetermined period of time has ended the valve 88 closes. This predetermined period of time might typically be 20 seconds. The period of time that the valve 88 remains open can be used to determine the dew point suppression that the apparatus 60 provides. The longer that the valve 88 remains open the more complete the purge of moisture that takes place. A very short purge results in not all of the water being removed and some water remaining adsorbed in the desiccant material. Because the desiccant is bound by a polymer binder it is able to operate under these circumstances without damage to the desiccant members. Indeed in the event of some mechanical failure, for example a leak from the tank which causes the compressor to run continuously which would result in saturation of the desiccant members, the desiccant material can recover once normal operation is resumed. As a result, a single size of the apparatus of the present invention can be used to provide a variety of the dew point suppressions by simply varying the period of time that the purge valve is open. Therefore, if solenoid valve 88 is provided with a variable timer, which allows out operator to alter the period of time that the valve remains open once the signal is received from the pressure switch 90, the apparatus can act to offer variable dew point suppression from a single apparatus. It is therefore possible, for example, for a manufacturer of air compressors to use a single size of the compressed air drying apparatus of the present invention on a variety of different sized compressors and storage tanks by simply varying the purge time by altering the time on the variable timer valve 88 to obtain the dew point suppression required.

At any point during the process compressed air can be drawn from the storage tank 64 for use. When the pressure in storage tank 64 drops below a predetermined value the compressor 62 restarts and the process of recharging the tank 64 begins repeating the steps set out above. In the event that the pressure in tank 64 reduces to below the predetermined value during the twenty second purge time that the solenoid valve 88 is open the solenoid valve 88 closes to prevent the compressed air from the compressor 62 escaping through outlet valve 88. Although the device in FIGS. 4 to 6 is shown aligned vertically the apparatus is equally capable of operating if aligned horizontally. In this instance it is preferable that the second outlet is located at the lowest point of the apparatus so that any excess droplet water tends to run towards second outlet where it is quickly removed during the purge cycle.

Figure 7:
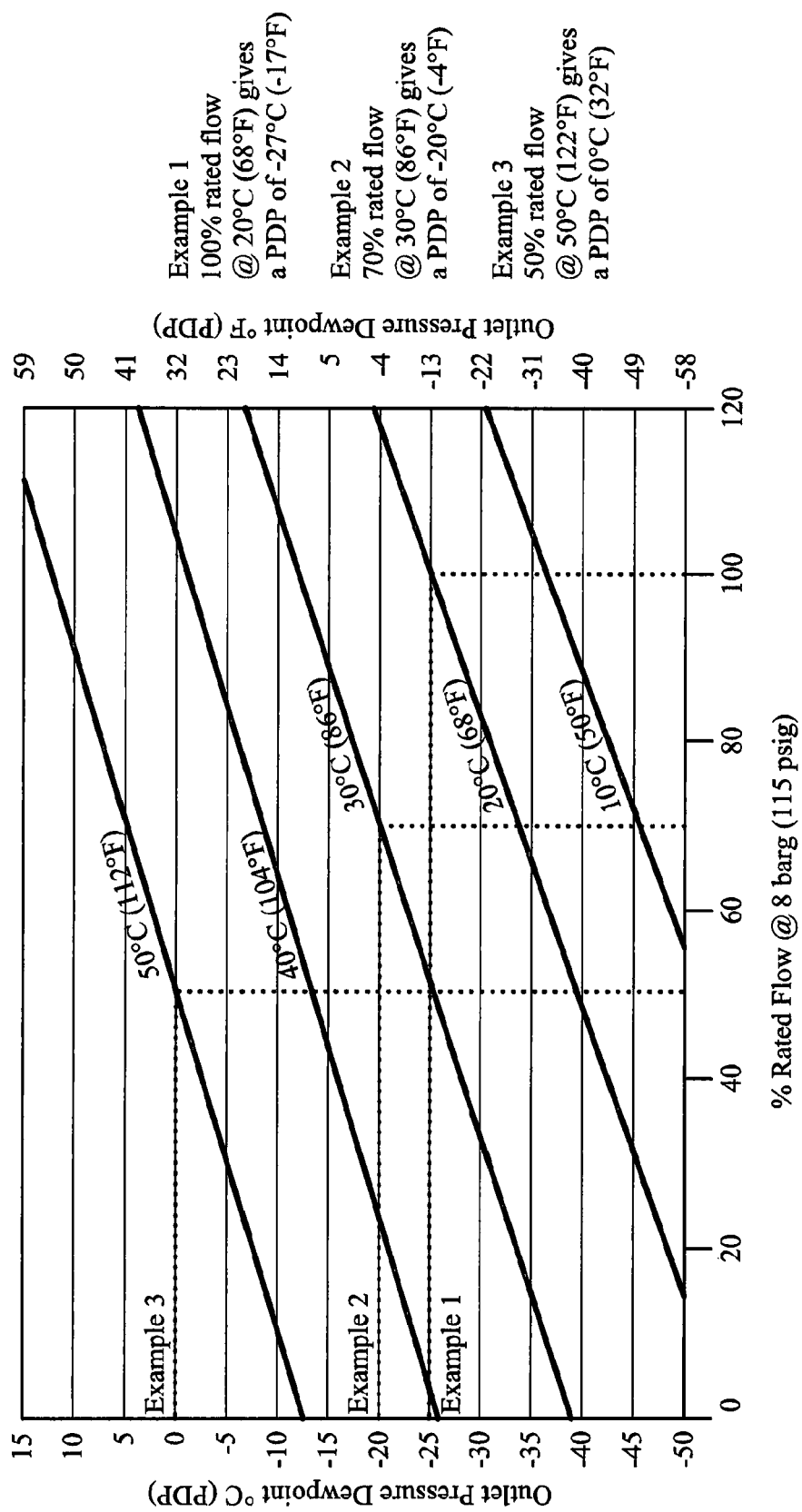
FIG. 7 is a graph illustrating the dew point suppression that can be achieved using the apparatus in FIGS. 4 to 6.

Referring to FIG. 7, the graphs shown thereon demonstrate how the device of the present invention can be used to select a dew point suppression. The graph shows that for a given inlet pressure dew point the conversion to outlet pressure dew point is substantially linear across the full range of percent rated flows at a given pressure and that the lines representing the inlet pressure dew points only marginally converge meaning that the pressure dew point suppression is fairly constant across a range of inlet pressure dew points. For example at a 100% rated flow and inlet PDP of 50° C. gives an outlet PDP of 10° C. meaning a dew point suppression of 40° C. At an inlet PDP of 40° C. there is an outlet PDP of −1° C. giving a dew point suppression of 41° C. At an inlet PDP of 30° C. the is an outlet PDP of −14° C. giving a dew point suppression of 44° C. At an inlet PDP of 20° C. there is an outlet PDP of −25° C. giving a dew point suppression of 45° C. Finally, at an inlet PDP of 20° C. there is an outlet PDP of −36° C. giving a dew point suppression of 46° C. It can therefore be seen that the dew point suppression only varies by 6° C. over the range of inlet PDP from 10 to 50° C.

It will be appreciated by persons skilled in the art that the above embodiments have been described by way of example only and not in any limitative sense, and that the various alterations and modifications are possible without departure from the scope of the invention as defined by the appended claims. For example, the desiccant material need not necessarily be formed in tubes extending along the length of a vessel. The PSA dryer would also work if filled with the desiccant dryer tubes cut into short lengths, formed in pellets or formed into beads. However, the fixed nature of the elongate tubes provides advantages of non-settling of the desiccant material and greater resistance to vibration therefore leading to no dust formation. It should also be noted that the example shown in FIG. 2 is an R&D test set up which, while is designed to replicate actual operating conditions, has instrumentation suitable for such testing. In normal use such instrumentation would not be used and the system would consist of the compressed air source (outside of our scope of supply) the inlet filtration, the dryer and a controller. The receiver and distribution system are also not part of the device of the present invention.

The invention claimed is:

1. A method of removing water from compressed air comprising, passing a stream of compressed air through a pressure swing adsorption dryer, the dryer including:
   at least one vessel containing at least one desiccant material formed into desiccant members using a polymer binder; and
   at least one control system for controlling the flow of said compressed air and switching the flow of said compressed air between a drying mode and a purging mode,
   wherein said vessel and said desiccant material contained therein are sized to produce a dew point suppression of less than 50° C., and
   wherein said desiccant members comprise a plurality of tubes extending along said vessel.

2. The method according to claim 1, wherein said vessel receives compressed air with a dew point of up to 50° C.

3. The method according to claim 1, wherein said desiccant material produces compressed air with dew points of greater than −10° C.

4. The method according to claim 1, wherein said dryer is not provided with means for heating the desiccant material during the purging mode.

5. A method of removing water from compressed air comprising, passing a stream of compressed air through a pressure swing adsorption dryer, the dryer including:
   at least one vessel containing a plurality of tubes extending along said vessel, the plurality of tubes formed from a desiccant material bound by a polymer binder; and
   at least one control system for controlling the flow of said compressed air and switching the flow of said compressed air between a drying mode and a purging mode,
   wherein said vessel and said desiccant material contained therein are sized to produce a dew point suppression of less than 50° C., and
   wherein said stream of compressed air flows through the plurality of tubes.

* * * * *